3,799,851
METHOD OF REMOVING ORGANO-LEAD COMPOUNDS FROM AQUEOUS MEDIA BY ALTERNATING CURRENT ELECTROLYSIS
Joseph E. Milam, New Martinsville, W. Va., assignor to PPG Industries, Inc., Pittsburgh, Pa.
No Drawing. Filed Dec. 19, 1972, Ser. No. 316,594
Int. Cl. C02b 1/82
U.S. Cl. 204—149            10 Claims

ABSTRACT OF THE DISCLOSURE

A method for reducing the organo lead content of dilute aqueous solutions and dispersions is disclosed. The lead is present as various organo-lead compounds from the manufacture of automotive anti-knock additives, and is in the form of compounds of the type $PbR_{4-n}Cl_n$, where R is an alkyl group and $n$ is a number between 0 and 2. As disclosed herein, a solution containing the organo-lead compound is electrolyzed in an electrolytic cell by alternating current electricity.

BACKGROUND

In the production of alkyl-lead compounds, especially tetraethyllead automotive anti-knock compound, a sodium-lead alloy and ethyl chloride are reacted in an autoclave. The autoclave product includes solids, liquids, and gases, e.g., sodium chloride, ethane, ethyl chloride, chlorinated hydrocarbons, lead alkyls, lead alkyl complexes and the like. The reaction product of the autoclave is fed to a steam still for separation. In the steam still separation process, considerable quantities of water and steam are added to the feed, and the gases are separated from the liquids and solids. The solid fraction yields tetraethyllead and other automotive anti-knock compounds, and the liquid and gaseous fractions are also rich in lead compounds.

Additionally, in various steps of the automotive anti-knock compound production process, reactants, intermediates, and products are contacted with large quantities of water. The water from the various intermediate processes as well as the by-products from the steam still present a serious lead disposal and control problem. In the past, it has been the practice to store these organo-lead containing streams in a clarifier tank or settling lagoon, treating them with sequestrants and precipitants to allow the lead to be converted to essentially insoluble lead compounds. Typically, the overflow from clarifier tanks and settling lagoons contains less than about 2000 parts per million of lead and may, after various treatments contain 0.5 part per million of lead. Generally the clarifier overflow and settling lagoon overflows contain from about 5 to about 200 parts per million of lead, and most commonly from about 10 to about 20 parts per million of lead.

Attempts to electrolytically remove the organo-lead compounds from various aqueous streams in the automotive anti-knock compound production process have in the past resulted in the production of water-soluble dimers and trimers of the organo-lead compound. Similarly, most attempts at removing the trace quantities of water-soluble organo-lead compounds and dispersed lead compounds by the use of complexing agents, sequestrants and pH control while practical, are not effective in reducing the lead content below about 20 parts per million.

SUMMARY OF THE INVENTION

It has now surprisingly been found that when aqueous solutions and dispersions of water-soluble organo-lead compounds are electrolyzed by an alternating current, the formation of the water-soluble dimers and trimers does not occur. Instead, the water soluble organo-lead compounds are substantially converted to water-insoluble forms.

According to an exemplification of this invention, a solution containing less than about 2000 parts per million of lead, e.g., from about 5 to about 200 and most frequently from about 10 to about 20 parts per million of water-soluble organo-lead compounds, is fed to an electrolytic cell. Within the cell electrolysis is conducted with an alternating current electrolyzing current. The solution is electrolyzed in the cell at a voltage of from about 2 volts to about 3 volts, root mean square, and a current density of from about 0.1 ampere per square centimeter to about 1.0 ampere per square centimeter.

When the residence time of the solution in the alternating current of the electrolytic cell is from about 1 minute to about 60 minutes, substantial removal of lead is effected.

According to this invention, it is possible to recover an effluent from the cell having a soluble lead content of about 5 parts per million or less, for example, 1 part per million of lead, or even as low as 0.05 part per million of lead. Additionally, there is recovered from the cell particulate lead compounds which may be separated from the solution by conventional separation means such as filtration, sedimentation, or settling.

DETAILED DESCRIPTION OF THE INVENTION

According to this invention, trace quantities of organo-lead compounds are removed from aqueous solution.

The water-soluble organo-lead compounds normally found in the production of lead alkyl automotive anti-knock compounds have the formula $PbR_{4-n}Cl_n$ where R is an alkyl having from 1 to 8 carbon atoms, and most frequently from 1 to 3 carbon atoms, and $n$ is a number from 0 to 2 and most commonly 1 or 2. Most commonly, R is a methyl group, —$CH_3$, or an ethyl group, —$C_2H_5$, although it may also be the propyl group, the butyl group, the pentyl group, the hexyl group, the octyl group, or the aryl group, $C_6H_5$.

The most common water-soluble organo-lead compounds produced as by-products of the lead alkyl automotive anti-knock compound production proces are triethyl lead chloride, $Pb(C_2H_5)_3Cl$, diethyllead dichloride, $$Pb(C_2H_5)_2Cl_2,$$

trimethyllead chloride, $Pb(CH_3)_3Cl$, and dimethyllead dichloride, $Pb(CH_3)_2Cl_2$. Most commonly, the principal water-soluble organo-lead compound is triethyllead chloride. Additionally, tetraethyl lead may be dispersed in the liquid composition. Such tetraethyl lead is removable by filtration, e.g., No. 40 Whatman filter paper. Whenever triethyllead chloride is referred to herein it will be understood to include the other dispersed compounds and water-soluble compounds normally present therewith.

The organo-lead compounds are most frequently present at trace levels well below the solubility limits of even relatively insoluble organo-lead compounds and the equilibrium concentrations of even substantially completely reacted organo-lead compounds. For example, the overflow from the clarifier pond or settling lagoon contains less than about 2000 parts per million of alkyl lead chlorides, and typically contains less than about 200 parts per million of the alkyl lead chloride compounds, and generally less than about 140 parts per million thereof. Most frequently, the overflow from the clarifier ponds and settling lagoons contains from about 1 to about 20 parts per million of these compounds. Additionally, the overflow from clarifier ponds and settling lagoons contains about 20 grams per liter of chlorine, sodium, and small amounts of aluminum and chromium, e.g., aluminum and chromium at about the 10 to 15 parts per million level.

According to this invention, these compounds may be removed from aqueous solution by alternating current electrolysis. Typically, this electrolysis would be at a current density of from about 0.01 ampere per square centimeter to about 1.0 ampere per square centimeter, with particularly good results being in the range of from about 0.02 ampere per square centimeter to about 0.67 ampere per square centimeter. At this current density, the root mean square alternating current voltage is from about 2.0 to 3.0 volts, most frequently from about 2.4 to about 2.8 volts. Current density, as the term is used herein, is the total current to the cell divided by the planar surface area of an electrode thereof. When the electrodes are in concentric configuration, i.e., that is when one electrode is within or surrounded by an electrode of oposite charge, then the surface area as used herein is the area of the smaller of the two electrodes or the smaller sum of electrodes of like charge connected in parallel.

The electrolyzing current is an alternating current. Most frequently, the electrolyzing current has a sine wave form, and a frequency of sixty cycles per second. However, both higher and lower frequencies may be used without deleterious effect. For example, frequencies as high as 300 or more cycles per second or even higher may be used. However, such high frequencies, i.e., higher than about 300 cycles per second, tend to produce particulate insoluble lead compounds having a particle size too small to be economically removed from the effluent in a commercial installation. Lower frequencies, e.g., as low as 30 cycles per second or even lower, e.g., about 30 cycles per minute may also be used, although hypochlorite ion may need to be added to the solution when such low frequencies are used.

Other alternating current wave forms, such as square wave or sawtooth patterns may also be used. At lower frequencies, e.g., lower than about 30 cycles per second, a sawtooth wave form is preferred.

A residence time of from about 1 minute to about 60 minutes is normally required for satisfactory removal of the aqueous organo-lead compound. Particularly satisfactory lead removal is obtained at residence times of from about 2 minutes to about 40 minutes. The particular optimum residence time may be readily determined by standard optimization techniques. "Residence time" as that term is used herein is the quotient of void volume of the electrolytic cell available for the electrolyte divided by the volumetric flow rate, where both the volume and volumetric flow rate are in consistent units.

The effluent from the alternating current electrolytic lead removal process is considerably diminished in organo-lead content, a feed containing 5 to 20 parts per million of lead will yield an effluent containing typically from about 1 part per million to about 5 parts per million of water-soluble total lead after treatment. The effluent from the cell is characterized by the presence of insoluble lead compounds which give the effluent a slight degree of coloration. At low frequencies, e.g., less than about 60 cycles per second, these particles of insoluble lead and lead compounds are large enough that they may be readily removed from the effluent by conventional physical separation means.

The insoluble lead species, as described above, may be recovered by filtration, sedimentation, or settling. For example, the insoluble lead species in the effluent from 60 cycles per second alternating current electrolytic lead removal may be recovered by passing the effluent through a filter having pore sizes corresponding to Number 42 Whatman filter paper. In this way, the insoluble lead compounds are removed from the cell effluent in a more highly concentrated form for subsequent treatment or recycling.

The following example is illustrative of the method of this invention.

EXAMPLE I

A liquid composition containing triethyllead chloride was subjected to alternating current electrolysis and reduced in soluble organo-lead content.

A liquid composition containing approximately 10 parts per million of lead as triethyllead chloride, 18.1 grams per liter of chloride ion as sodium chloride, and a pH of 7, was filtered through a 1 micron filter to remove the solid matter. Six hundred and seventy-five milliliters of the solution was poured into a 1000 milliliter beaker. The beaker contained concentric electrodes, the one electrode being a 2.8 centimeter high cylindrical platinum screen 2.8 centimeters in diameter, and the opposite electrode being a 5.7 centimeter high platinum screen, 5.2 centimeters in diameter. A 60 cycle alternating current voltage of 2.5 volts was established across the electrode at a current of 5 amperes giving a current density of 0.2 ampere per square centimeter based on the area of the smaller of the two electrodes. Shortly thereafter, the alternating current was increased to 7 amperes, giving a current density of 0.38 ampere per square centimeter based on the area of the smaller of the two electrodes.

Gas evolution was noted, and the electrolyte darkened. After 10 minutes of alternating current electrolysis, a sample of the electrolyte was taken, filtered through No. 42 filter paper, and found to contain 8.8 parts per million of lead as water-soluble lead compounds. After 20 minutes of alternating current electrolysis, a sample was taken, filtered through No. 42 filter paper, and found to contain 7.2 parts per million of water-soluble lead compounds, mainly triethyllead chloride. After 40 minutes of alternating current electrolysis, a sample was taken and filtered through No. 42 filter paper and found to contain 4.2 parts per million of water-soluble lead compounds. During the course of the electrolysis, the electrolyte became progressively darker in color and a black, non-soluble deposit was formed on the faces of the electrodes. The black deposit rubbed off easily and was found to be rich in lead content.

Although the present invention has been described with reference to specific details or particular embodiments thereof, it is not intended thereby to limit the scope of the invention except insofar as specific details are recited in the appended claims.

I claim:

1. A method of reducing the concentration of water-soluble organo-lead compounds having the formula $RbR_{4-n}Cl_n$ where R is chosen from the group consisting of methyl, ethyl, propyl, butyl, pentyl, hexyl, heptyl, octyl, and aryl radicals, and $n$ is from 0 to 2, in aqueous solution having from about 0.1 part per million to about 2000 parts per million calculated as elemental lead, comprising:

passing an alternating electric current wherein the voltage of the applied alternating current is from about 2 to 3 volts root mean squared, through said solution; and recovering the solution reduced in water-soluble lead content.

2. The method of claim 1 wherein the water-soluble organo-lead compound is chosen from the group consisting of triethyllead chloride, diethyllead dichloride, trimethyllead chloride, dimethyllead dichloride, and mixtures thereof.

3. The method of claim 1 wherein the electrolysis is carried out for from about 1 to about 60 minutes.

4. The method of claim 1 wherein the applied alternating current has a frequency of from 30 cycles per minute to 300 cycles per second.

5. The method of claim 1 wherein the applied alternating current has a frequency of about 60 cycles per second.

6. The method of claim 1 wherein the current density based on the area of the electrodes of like polarity is from about 0.01 to about 1.0 ampere per square centimeter.

7. The method of claim 1 wherein the solution recovered contains from about 0.01 to about 1 part per million of water-soluble lead compounds as calculated as lead.

8. The method of claim 1 wherein particulate insoluble lead compounds are recovered.

9. A method of reducing the concentration of water-soluble lead compounds in an aqueous solution comprising:

feeding an aqueous solution containing from about 0.1 to about 2000 parts per million of water-soluble organo-lead compounds chosen from the group consisting of organo-lead compounds having the formula $Pb_{4-n}Cl_n$ wherein R is chosen from the group consisting of methyl, ethyl, propyl, butyl, pentyl, hexyl, heptyl, octyl, and aryl radicals, and $n$ is from 0 to 2, to an electrolytic cell;

passing an alternating current through said solution at a frequency of from about 30 cycles per minute to about 300 cycles per second, a voltage of from about 2 to about 3 volts and a current density of from about 0.1 to about 1 ampere per square centimeter, for from about 1 to about 60 minutes; and recovering therefrom an effluent containing from about 0.01 to about 1 part per million of water-soluble organo-lead compounds calculated as lead.

10. A method of reducing the concentration of water-soluble lead compounds in an aqueous solution comprising:

feeding an aqueous solution containing from about 0.1 to about 2000 parts per million of triethyllead chloride to an electrolytic cell;

passing an electrolytic current through said solution at a frequency of about 60 cycles per second, a voltage of from about 2.4 volts to about 2.8 volts, and current density of from about 0.02 to about 0.67 ampere per square centimeter for from about 2 to about 40 minutes;

recovering an effluent containing from about 0.01 to about 1 part per million of water-soluble lead compounds, and particulate insoluble lead compounds; and recovering the particulate insoluble lead compounds from the effluent.

References Cited

UNITED STATES PATENTS

| | | | |
|---|---|---|---|
| 3,457,152 | 7/1969 | Maloney et al. | 204—131 |
| 3,586,627 | 6/1971 | Gooch | 204—149 X |
| 3,616,356 | 10/1971 | Roy | 204—152 |
| 3,696,009 | 10/1972 | Mayerle et al. | 204—72 |

FREDERICK C. EDMUNDSON, Primary Examiner

UNITED STATES PATENT OFFICE
CERTIFICATE OF CORRECTION

Patent No. 3,799,851      Dated March 26, 1974

Inventor(s) Joseph E. Milam

It is certified that error appears in the above-identified patent and that said Letters Patent are hereby corrected as shown below:

Column 4, line 48, "RbR" should read -- PbR --.

Column 5, line 14, "Pb" should read -- PbR --.

Signed and sealed this 17th day of September 1974.

(SEAL)
Attest:

McCOY M. GIBSON JR.      C. MARSHALL DANN
Attesting Officer      Commissioner of Patents